United States Patent
Pfau et al.

(10) Patent No.: US 9,330,863 B2
(45) Date of Patent: May 3, 2016

(54) APPARATUS FOR AND METHOD OF REDUCING ROTARY KNOB NOISE

(71) Applicants: Douglas Allen Pfau, Canton, MI (US); David Michael Whitton, Saline, MI (US); Daren Lee Harris, Canton, MI (US)

(72) Inventors: Douglas Allen Pfau, Canton, MI (US); David Michael Whitton, Saline, MI (US); Daren Lee Harris, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 44 days.

(21) Appl. No.: 14/495,042

(22) Filed: Sep. 24, 2014

(65) Prior Publication Data

US 2016/0086749 A1    Mar. 24, 2016

(51) Int. Cl.
*H01H 19/11*    (2006.01)
*H01H 11/00*    (2006.01)

(52) U.S. Cl.
CPC .............. *H01H 19/11* (2013.01); *H01H 11/00* (2013.01)

(58) Field of Classification Search
CPC .............................. H01H 19/11; H01H 11/00
USPC .......... 200/11 R, 336, 564, 565, 296, 293, 4, 200/18, 570; 29/622
See application file for complete search history.

(56) References Cited

U.S. PATENT DOCUMENTS

| | | | | |
|---|---|---|---|---|
| 4,196,324 A | * | 4/1980 | Kojima | H01H 19/585 200/11 A |
| 6,374,696 B1 | * | 4/2002 | Blake, III | B60H 1/0065 200/565 |
| 7,067,744 B2 | * | 6/2006 | Mere | H01H 19/005 200/18 |
| 8,686,306 B2 | * | 4/2014 | Harris | B60K 37/06 200/336 |
| 2014/0047943 A1 | | 2/2014 | Camli et al. | |

* cited by examiner

*Primary Examiner* — Edwin A. Leon
(74) *Attorney, Agent, or Firm* — Dickinson Wright PLLC

(57) ABSTRACT

The aspects of the present disclosure provide an apparatus for and method of reducing rotary knob produced by a plurality of detents. In particular, a rotary retainer within a rotary knob assembly. The rotary retainer has a generally cylindrical body and an angular flange protruding outwardly from and around the generally cylindrical body and a plurality of detents disposed on the angular flange. The angular flange is made of a first material capable of sustaining a torque exceeding a first predetermined threshold and wherein the plurality of detents are made from a second material different from the first material, the second material being capable of sustaining a torque exceeding a second predetermined threshold, and the first material and the second material are configured to dampen noise generated by the plurality of detents when the rotary knob is operated.

16 Claims, 6 Drawing Sheets

APPARATUS FOR AND METHOD OF REDUCING ROTARY KNOB NOISE

FIELD OF THE DISCLOSURE

The present disclosure relates generally to an apparatus for and method of reducing rotary knob unintended audible noise. In particular, reducing unintended noise or feedback caused by a plurality of detents within a rotary knob assembly.

BACKGROUND OF THE DISCLOSURE

Rotary knob assemblies for adjusting vehicle settings such as a temperature controller within a vehicle control panel are well-known. Such rotary knobs may be used to, but are not limited to, adjust volume or temperature within the vehicle. Such rotary knobs allow a user greater control than the user would experience through the use of a button. Currently, some rotary knobs are designed to provide feedback to the user during operation to alert the user of the position of the rotary knob. Such feedback may include, but is not limited to, stops and/or haptic feedback. Typically, such rotary knob assembly may include a control panel, a rotary knob rotatably affixed to the control panel, and a plurality of detents disposed within the rotary knob. Additionally, a motor may be coupled to the rotary knob and a sensor may be provided to detect the position and direction of the rotary knob. A microprocessor may further be in communication with the motor and the sensor. The microprocessor may be configured to receive the position of the rotary knob detected by the sensor and may send haptic feedback to the user through the rotary knob.

In addition to providing haptic feedback, a clicking sound or audible noise can be produced when the rotary knob is operated. The clicking sound or audible noise may be caused by the plurality of detents within the rotary knob. In particular, certain forces are applied to the assembly which causes a portion the rotary knob assembly to lose contact with or disengage the plurality of detents during rotation. As a result, when contact is regained by or re-engages the rotary knob, a clicking sound or audible noise is produced. Such clicking sound or audible noise may be distracting to the user or may interfere with the user overall enjoyment of the vehicle. For example, the clicking sounds or audible noise may be heard over conversations the user may have with others inside or outside of the vehicle or may be heard over other sounds caused by the vehicle including, but not limited to, music or radio playing throughout the vehicle.

Currently, there is not a solution or device which prevents the clicking sounds or audible noise caused by the detents when the rotary knob is operated. Thus, a need for an improved rotary knob assembly which has the ability to reduce undesirable noise caused by operation of the rotary knob as well as a method for reducing rotary knob noise.

SUMMARY OF THE DISCLOSURE

The aspect of the present disclosure provides an apparatus for and a method of reducing rotary knob noise caused by a plurality of detents. The apparatus for being a rotary knob assembly.

An aspect of the rotary knob assembly includes a rotary retainer having a generally cylindrical body and an angular flange protruding outwardly from and around the generally cylindrical body. Additionally, a plurality of detents are disposed on the angular flange. The angular flange is made of a first material capable of sustaining a torque exceeding a first predetermined threshold. The plurality of detents are made of a second material different from the first material, the second material being capable of sustaining a torque exceeding a second predetermined threshold. The first material and the second material are configured to dampen noise generated by the plurality of detents when the rotary knob is operated. Other aspects of the rotary knob assembly may include the angular flange being made of a plurality of materials capable of sustaining a torque exceeding a first predetermined threshold and/or the plurality of detents being made of a plurality of materials capable of sustaining a torque exceeding a second predetermined threshold. The plurality of materials are configured to dampen noise generated by the plurality of detents when the rotary knob is operated.

Another aspect of the rotary knob assembly includes a first bezel affixed to a rear cover of a vehicle control panel, a second bezel for receiving the rotary knob assembly and being affixed to the first bezel, and a detent spring having at least one stop and being disposed within the second bezel. The rotary knob assembly further includes a rotary retainer having a generally cylindrical body and an angular flange protruding outwardly from and around the generally cylindrical body. The angular flange has a plurality of detents disposed thereon. The plurality of detents engage the detent spring and the rotary retainer is configured to rotate about the detent spring. A stabilizer ring is disposed within the generally cylindrical body of the rotary retainer for attaching the rotary retainer to the detent spring, and an outer knob is rotatably affixed to the first bezel and surrounds the rotary retainer to form the rotary knob. The angular flange of the rotary retainer is made of a first material capable of sustaining a torque exceeding a first predetermined threshold and the plurality of detents are made from a second material different from the first material, the second material being capable of sustaining a torque exceeding a second predetermined threshold, and the first material and the second material are configured to dampen noise generated by the plurality of detents when the plurality of detents disengage and reengage the detent spring. Other aspects of the rotary knob assembly may include the angular flange being made of a plurality of materials capable of sustaining a torque exceeding a first predetermined threshold and/or the plurality of detents being made of a plurality of materials capable of sustaining a torque exceeding a second predetermined threshold. The plurality of materials are configured to dampen noise generated by the plurality of detents when the plurality of detents disengage and reengage the detent spring An aspect of the method for reducing rotary knob noise includes providing a rotary retainer having a generally cylindrical body and an angular flange protruding outwardly from and around the generally cylindrical body, the angular flange having a plurality of detents disposed thereon. The angular flange is made of a first material capable of sustaining torque exceeding a first predetermined threshold and the plurality of detents are made of a second material different from the first material, the second material being capable of sustaining torque exceeding a second predetermined threshold, and the first material and the second material are configured to dampen noise generated by the plurality of detents when the rotary knob is operated.

The aspects of the present disclosure provide various advantages. For example, the configuration of the rotary retainer being made of different types of material absorbs and/or reduces the clicking sound or audible noise produced by the plurality of detents when the rotary knob is operated. Additionally, a user of the vehicle will be less distracted by the operation of the rotary knob assembly and their overall enjoyment of the vehicle will increase as the clicking sound and/or audible noise is reduced. Moreover, the user will be able to have conversations inside or outside the vehicle or play music or the radio without being interrupted by a clicking sound or other noise.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION OF THE ENABLING EMBODIMENTS

Detailed examples of the present disclosure are provided herein; however, it is to be understood that the disclosed examples are merely exemplary and may be embodied in various and alternative forms. It is not intended that these examples illustrate and describe all possible forms of the disclosure. Rather, the words used in the specification are words of description rather than limitation, and it is understood that various changes may be made without departing from the spirit and scope of the disclosure.

The aspects disclosed herein provide a rotary knob assembly configured to reduce noise generated by a plurality of detents when the rotary knob of the assembly is operated. Other aspects include a method of reducing noise generated of a rotary knob. The rotary knob assembly includes a rotary retainer having a generally cylindrical body and an angular flange protruding outwardly from and around the generally cylindrical body and a plurality of detents disposed on the angular flange. The angular flange is made of a first material capable of sustaining torque exceeding a first predetermined threshold and the plurality of detents are made of a second material different from the first material, the second material being capable of sustaining torque exceeding a second predetermined threshold, and the first material and the second material are configured to dampen noise generated by the plurality of detents when the rotary knob is operated. The method includes providing such a rotary retainer described above.

As those of ordinary skill in the art will understand, various features of the present disclosure as illustrated and described with reference to any of the Figures may be combined with features illustrated in one or more other Figures to produce examples of the present disclosure that are not explicitly illustrated or described. The combinations of features illustrated provide representative examples for typical applications. However, various combinations and modifications of the features consistent with the teachings of the present disclosure may be desired for particular applications or implementations.

Figure 1:
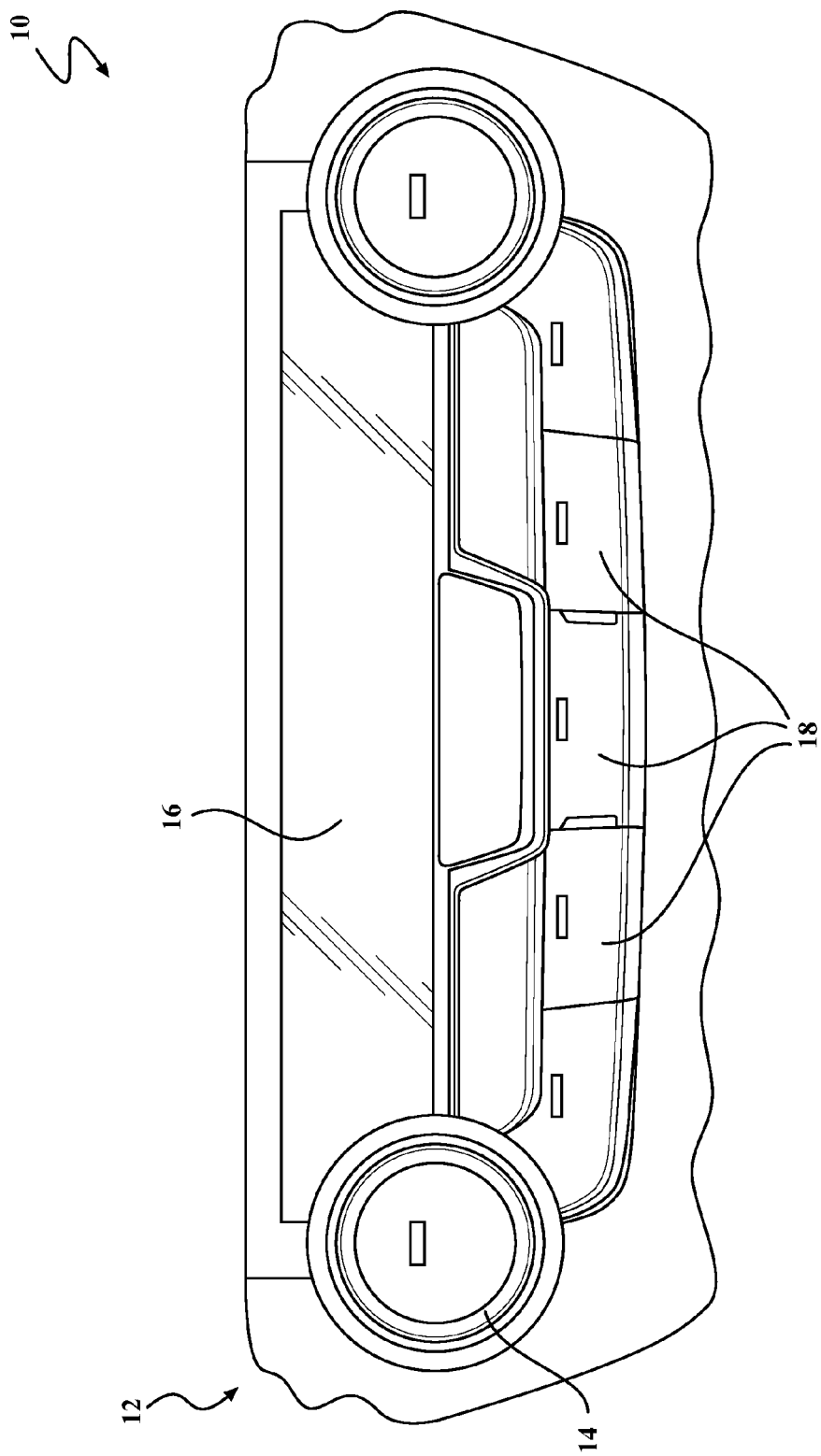
FIG. 1 is a vehicle control panel having a rotary knob assembly disposed thereon in accordance with the present disclosure.

FIG. 1 is an illustration of a vehicle control panel 10 having a rotary knob assembly 12 in accordance with the present disclosure. The rotary knob assembly 12 may have a rotary knob 14 which may be configured to adjust temperature within a vehicle as shown in FIG. 1 or may be configured to adjust other vehicle features including, but not limited to, audio volume. The vehicle control panel 10 may also include a liquid crystal display (LCD) screen 16 for displaying information regarding the selected features and a button cap panel 18 having a plurality of buttons to select and/or adjust other features of the vehicle.

Figure 2:
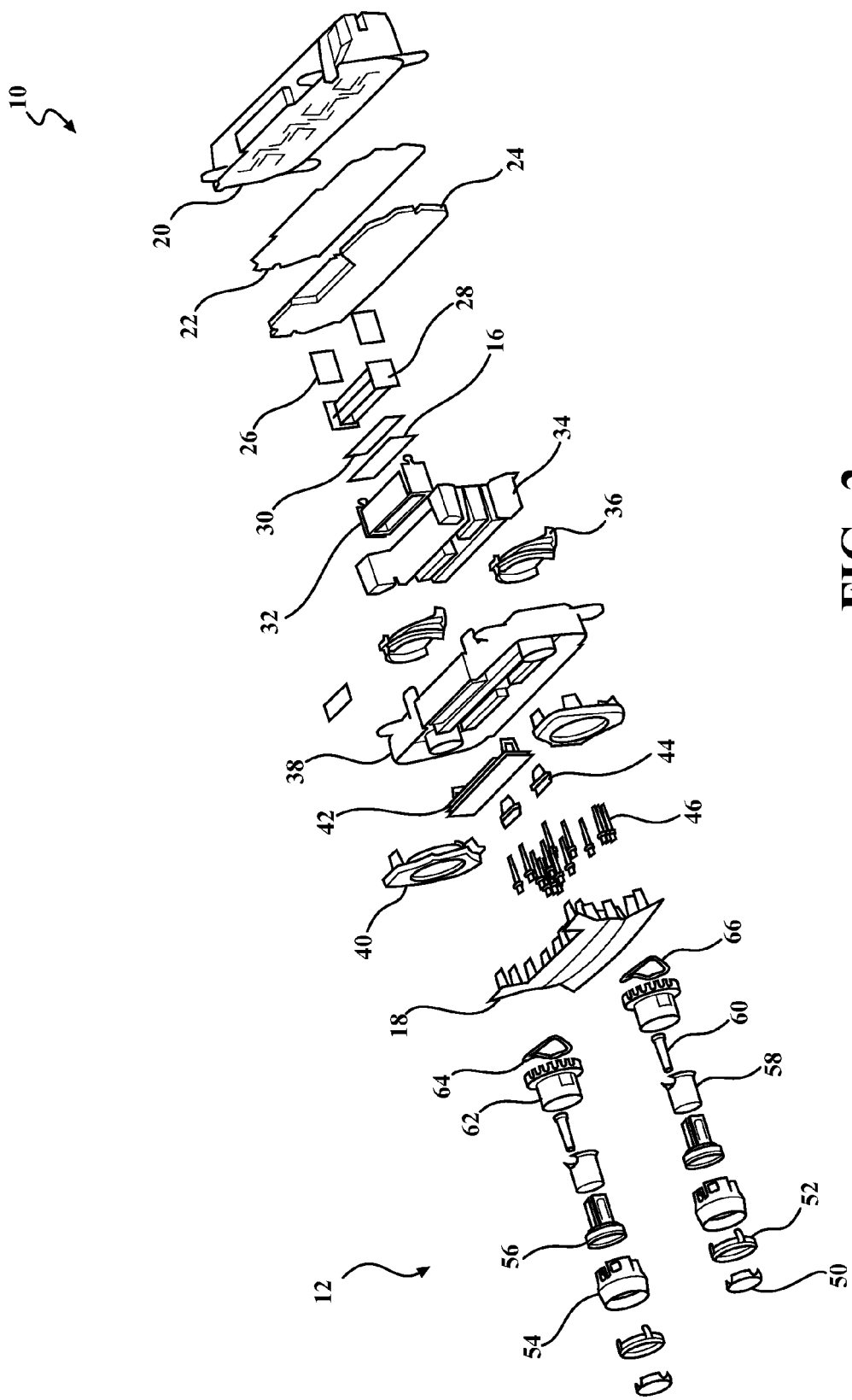
FIG. 2 is an illustration of an exploded view of the vehicle control panel and rotary knob assembly in accordance with the present disclosure.

FIG. 2 is an illustration of an exploded view of the vehicle control panel 10 in accordance with the present disclosure. The vehicle control panel 10 includes a rear cover 20. The rear cover 20 may be disposed within a dashboard or front console of the vehicle. The rear cover 20 acts as the backbone of the vehicle control panel 10. A printed wire board (PWB) 22 may be disposed on the rear cover 20 for electrically connecting various electronic components within the vehicle control panel 10. A switch mat 24 may be disposed on the PWB 22. The switch mat 24 is designed to interface between various electronics components and the PWB 22. The switch mat 24 receives at least one connector 26 such as, but not limited to, a zebra connector. The at least one connector 26 may be two connectors or two zebra connector as shown in FIG. 2. The at least one connector 26 may be used as an intermediary between a LCD screen 16 and the PWB 22.

Also, in regards to FIG. 2, a liquid crystal display (LCD) holder 28 may receive the at least one connector 26 and a diffuser 30 may be disposed on the LCD holder 28 for distributing light across the LCD screen 16. A metal frame 32 and a button retainer 34 may fully or partially surround the LCD screen 16. Additionally, at least one light guide 36 may be disposed on the switch mat 24 adjacent to the button retainer 34. The at least one light guide 36 may be a plurality of light guides. The at least one light guide 36 may be used to distribute light around the front portion of the rotary knob 14 through, for example, a halo ring.

FIG. 2 further shows a first bezel 38 disposed over the at least one light guide 36 and the button retainer 34. The first bezel 38 may be affixed to the rear cover 20 through the switch mat 24 and PWB 22. The first bezel 38 may others be known as a function bezel and may be configured to receive the components which forms the rotary knob assembly 12. A protective lens 42 for protecting the LCD screen 16 may be affixed to the first bezel 38 and a second bezel 40 may be disposed on the first bezel 38 for receiving the rotary knob assembly 12. The second bezel 40 may be a decorative bezel for receiving the rotary knob assembly 12. A divider bar 44 may be disposed in the first bezel 38 adjacent to the protective lens 42 and a plurality of button jewels 46 may also be disposed within the first bezel 38. A button cap panel 18 is affixed to the first bezel 38, over the button jewels 46, and surrounding the LCD screen 16 and the protective lens 42.

Additionally, FIG. 2 shows the components of the rotary knob assembly 12. The rotary knob assembly 12 may be rotatably affixed to the first bezel 38 through the second bezel 40. A plurality of detents 48 may be disposed within the rotary knob 14. In particular, the rotary knob assembly 12 includes a button cap 50 and a chrome ring 52 configured to receive the button cap 50. The rotary knob assembly 12 also includes a rotary grip or outer knob 54 designed to receive the chrome ring 52 and a halo ring 56 disposed within the rotary grip or outer knob 54. The rotary knob assembly 12 further includes a button retainer 58, a jewel chimney 60, a rotary retainer 62, and a detent spring 64. The rotary knob assembly 12 will be described in more detail below in FIG. 3.

Figure 3:
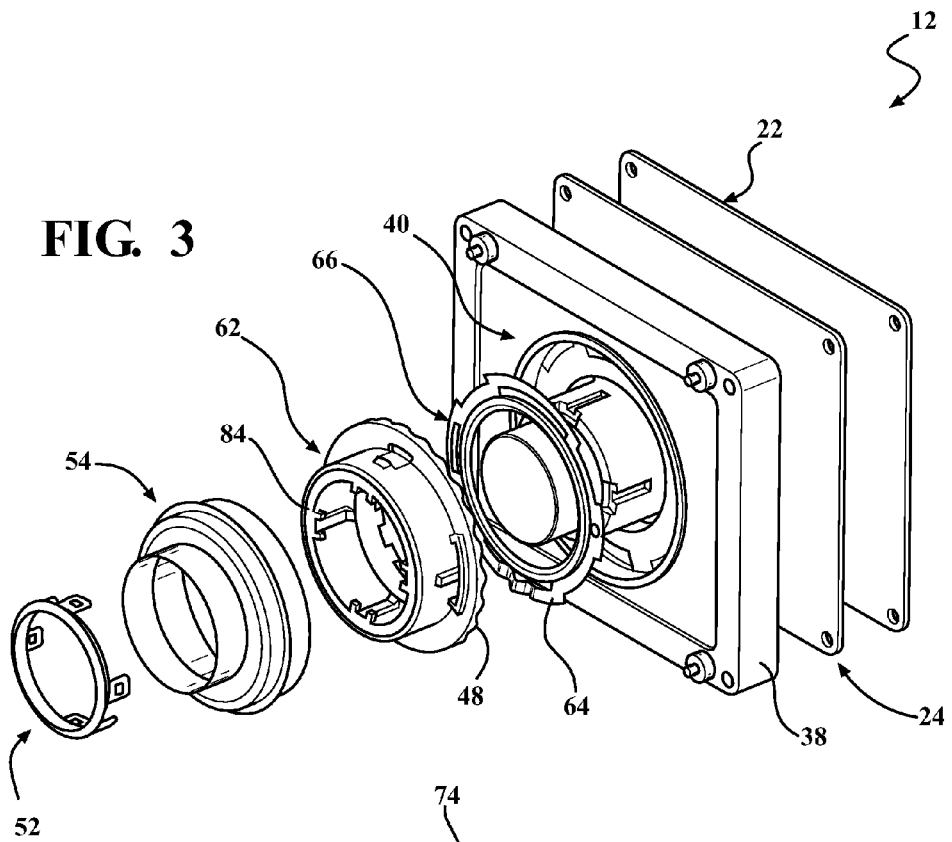
FIG. 3 is an illustration of an exploded view of the rotary knob assembly in accordance with the present disclosure.

FIG. 3 is an illustration of an exploded view of the rotary knob assembly 12 in accordance with the present disclosure. Similar to FIG. 2, FIG. 3 shows a PWB 22, a switch mat 24 disposed on the PWB 22, and a first bezel 38 and a second bezel 40 disposed within the first bezel 38. The detent spring 64 may be disposed within the second bezel 40 and floats within the second bezel 40. The detent spring 64 may have at least one stop 66 for alerting the user when the rotary knob 14 has been rotated to a specific position. The rotary retainer 62 may be disposed on the detent spring 64 and rotates about the detent spring 64. The rotary retainer 62 may have the plurality of detents 48 disposed thereon. The rotary retainer 62 will be further described in FIGS. 4-6. The rotary grip or outer knob 54 surrounds the rotary retainer 62 and receives the chrome ring 52 to form the rotary knob 14.

Figure 4:
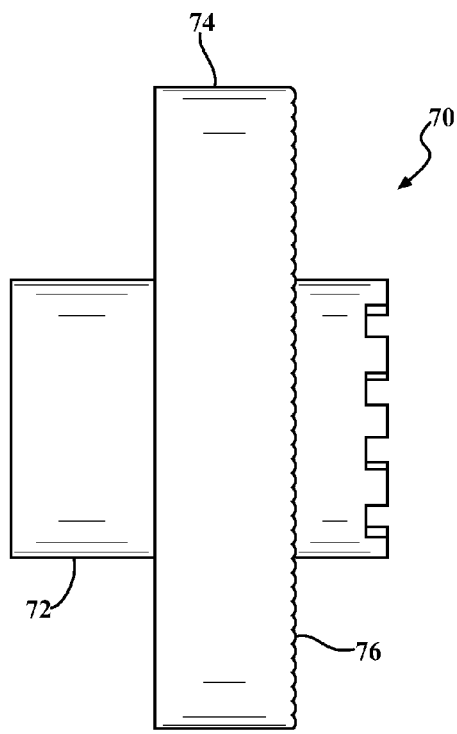
FIG. 4 is an illustration of a perspective view of a prior art rotary retainer.

FIG. 4 is an illustration of a perspective view of a prior art rotary retainer 70 of the rotary knob. The rotary retainer 70 may have a generally cylindrical body 72 with an angular flange 74 protruding outwardly and around the cylindrical body 72. The angular flange 74 may have a plurality of detents 76 or an undulated surface disposed thereon. The plurality of detents 76 may engage the detent spring (not shown) when the rotary knob is operated. The rotary retainer 70, angular flange 74, and the plurality of detents 76 disposed on the angular flange 74 are each made of the same material. A stabilizer ring (not shown) may affix the rotary retainer 70 to the detent spring.

When a user operates the rotary knob of FIG. 1 in combination with the prior art rotary retainer 70 of FIG. 4, various forces are applied to the rotary knob which cause a variety of desired feedback such as haptic feedback or vibrations to alert the user of the rotational position of the rotary knob and undesired feedback such as a clicking sound or audible noise.

Such forces include a constant force and a detent force. The constant force is the constant torque or motion experienced by the rotary knob when operated by the user. While the detent force is a torque or motion that varies based on the rotational angle of the rotary knob when the user operates or rotates the rotary knob. At times during rotation, the plurality of detents loses contact with or disengages from the detent spring when a higher rotational velocity or speed is applied by the user. When the plurality of detents 76 and angular flange 74 regains contact with or re-engages the detent spring an undesirable noise such as a clicking sound or other audible noise is produced. As will be described below the rotary retainer 62 of FIGS. 5-6 will solve the problem caused by the prior art shown in FIG. 4.

Figure 5:
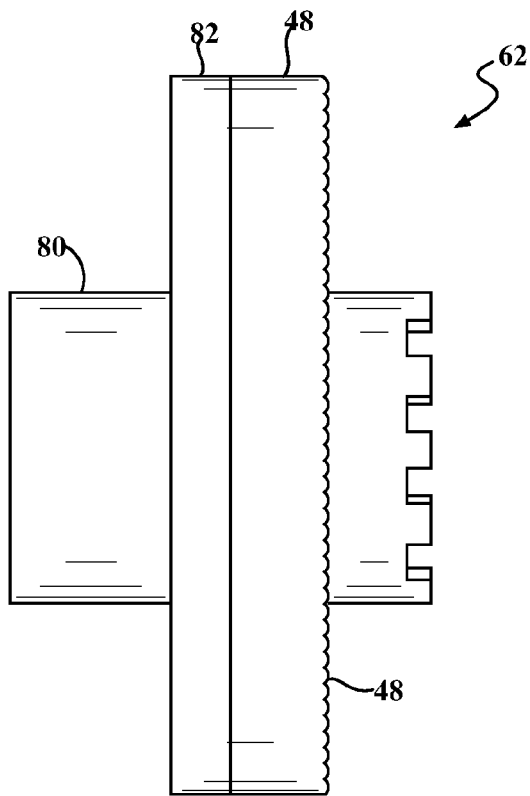
FIG. 5 is an illustration of a perspective view of an improved rotary retainer of the rotary knob assembly in accordance with the present disclosure.

FIG. 5 is an illustration of a perspective view of an improved rotary retainer 62 in accordance with the present disclosure. As discussed above, the rotary retainer 62 may have a generally cylindrical body 80 and an angular flange 82 protruding outwardly and around the cylindrical body 80. The angular flange 82 may have a plurality of detents 48 or an undulated surface disposed thereon. The angular flange 82 may be made of a first material. The first material may be a material able to sustain a torque exceeding a first predetermined threshold. Such material may be a polymeric material or a thermoplastic elastomer including, but not limited to, plastic, rubber, vinyl, resin, and a similar material. Additionally, the first material may also have a predetermined thickness and a predetermined strength. The types of material and the predetermined thick of the materials may assist in dampening or absorbing noise produced by the rotary knob assembly 12. Further, a stabilizer ring 84 may be disposed within the rotary retainer 62 and may have two friction surfaces for controlling wobble and compression of the rotary knob. The stabilizer ring 84 may be made of a metallic material.

Unlike, the portion of the angular flange 82 made of the first material, the plurality of detents 48 may be made of a second material different from the first material. The second material may be a polymeric material or a thermoplastic elastomer, including but not limited to, hytrel. The second material may have a predetermined thickness and a predetermined strength. The predetermined thickness of the second material may be different than the predetermined thickness of the first material. The predetermined thickness may assist in the process of damping noise produced from the plurality of detents as the rotary knob operates. The second material may be a material able to sustain a torque exceeding a second predetermined threshold. The second predetermined threshold may be the same as or equal to the first predetermined threshold of the first material.

In operation, the first material and the second material are configured to reduce noise generated by the plurality of detents 48 caused by the forces applied to the plurality of detents during rotation of the rotary knob. Unlike the prior art of FIG. 4, the combination of the first material and the second material act as a barrier and absorbs or dampens the clicking sound or audible noise when the rotary knob rotates at a high velocity i.e. when the plurality of detents 48 disengages and re-engages contact with the detent spring.

Figure 6:
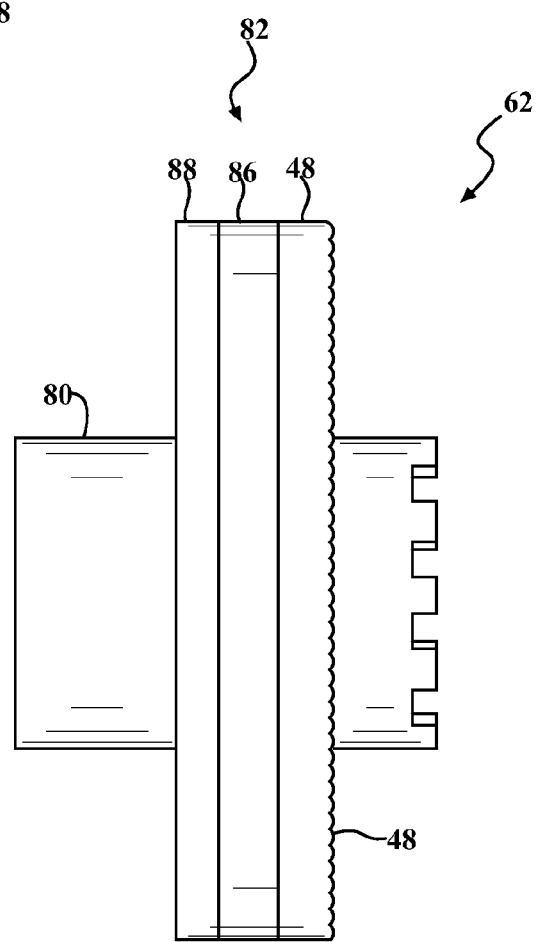
FIG. 6 is an illustration of perspective view of another embodiment of improved rotary retainer in accordance with the present disclosure.

With respect to FIG. 6, an illustration of another perspective view of a rotary retainer 62 is provided. As discussed above, the rotary retainer 62 may have a stabilizer ring (not shown) disposed within the cylindrical body 80 having an angular flange 82 with a plurality of detents 48 disposed thereon. The angular flange 82 may have a first portion 86 made of the first material. The plurality of detents 48 may be made of a second material. Additionally, the angular flange 82 may have a second portion 88 made of a third material. The first portion 86 of the angular flange 82 being disposed on the second portion 88 and the plurality of detents 48 being disposed on the first portion 86.

As described above, the first material may be made of a polymeric material or thermoplastic elastomer and the second material may be made of a polymeric material or thermoplastic elastomer different from the first material. The first and second materials may be able to sustain a torque exceeding a first predetermined threshold or a first and second predetermined threshold. The third material may be different from the first material and second material or may be made of one of the first and second materials. The third material may also be a polymeric material or a thermoplastic elastomer and may be able to sustain a torque exceeding a third predetermined threshold. Similarly, the third material may have a predetermined thickness and strength. Additionally, the cylindrical body 80 of the rotary retainer 62 may be made of the same material as the plurality of detents 48 or may be made from a different material.

Figure 7A:
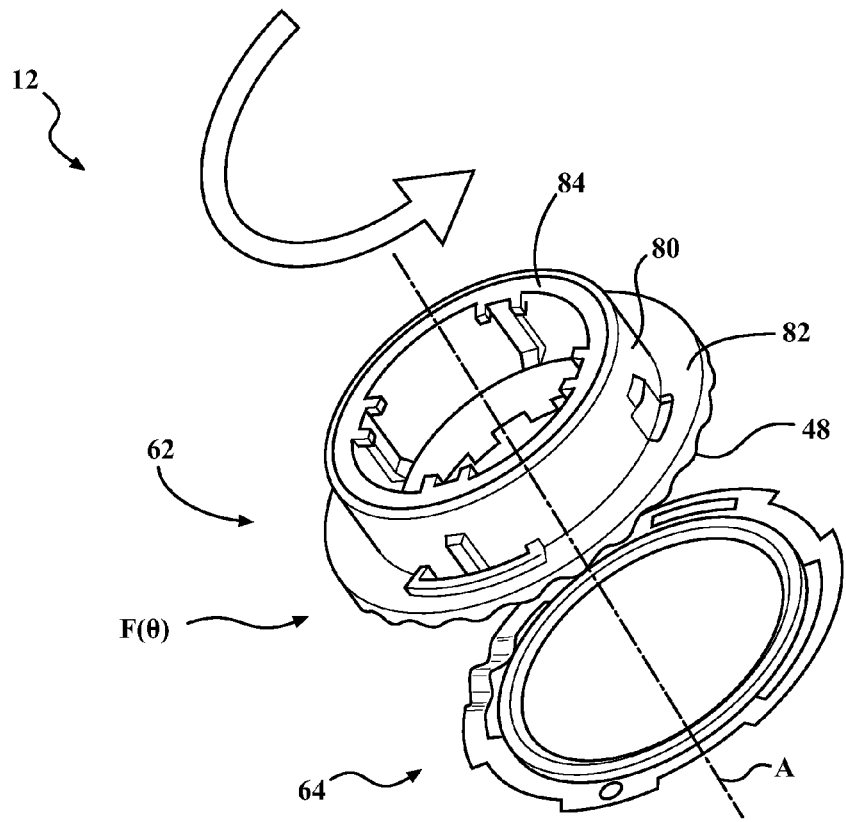
FIGS. 7A and 7B are illustrations of various radial views of the improved rotary retainer within the rotary knob assembly in accordance with the present disclosure.
Figure 7B:
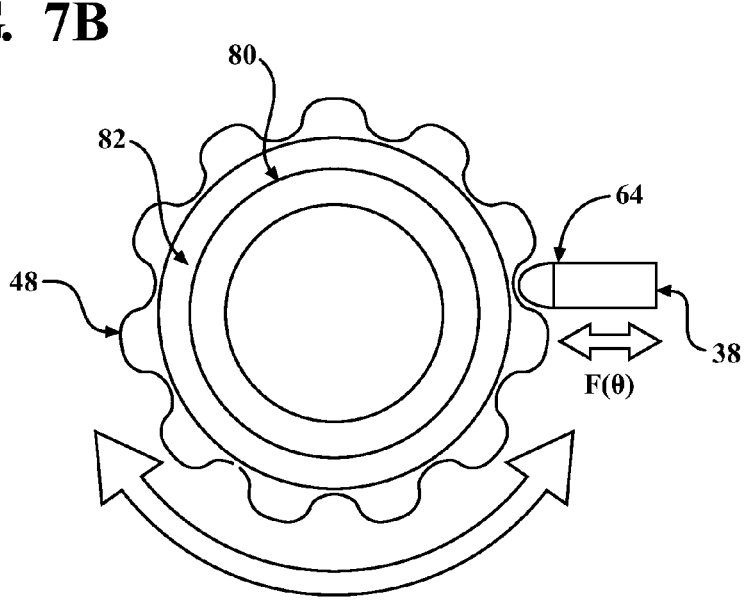

FIGS. 7A-B are illustrations of various radial views of the rotary retainer 62 and detent spring 64 in accordance with the present disclosure. Specifically, FIG. 7A shows a perspective view of the rotary retainer 62 engaging the detent spring 64. While FIG. 7B shows a top view of the rotary retainer 62 engaging the detent spring 64. As described above, the rotary retainer 62 may have a cylindrical body 80 having an angular flange 82 extending outwardly from the cylindrical body 80. The rotary retainer 62 may also have a plurality of detents 48 disposed on the angular flange 82. The angular flange 82 may be made of a first material while the plurality of detents 48 may be made of a second material different from the first material. Additionally, the rotary retainer 62 may be in contact with the detent spring 64. The detent spring 64 may be disposed on the first bezel 38. The plurality of detents 48 rotates about the detent spring 64 as shown by dashed line A (shown in FIG. 7A). While the rotary knob and in particular, the plurality of detents 48 rotate about the detent spring 64, the combination of the first material and the second material may be configured to reduce noise generated by the plurality of detents 48 caused by forces F(θ) applied to the plurality of detents 48 during rotation. In other words, the first material and the second material act as a barrier and absorbs or dampens the clicking sound or audible noise when the rotary knob rotates at a high velocity i.e. when the plurality of detents 48 disengages and re-engages contact with the detent spring 64.

Figure 8:
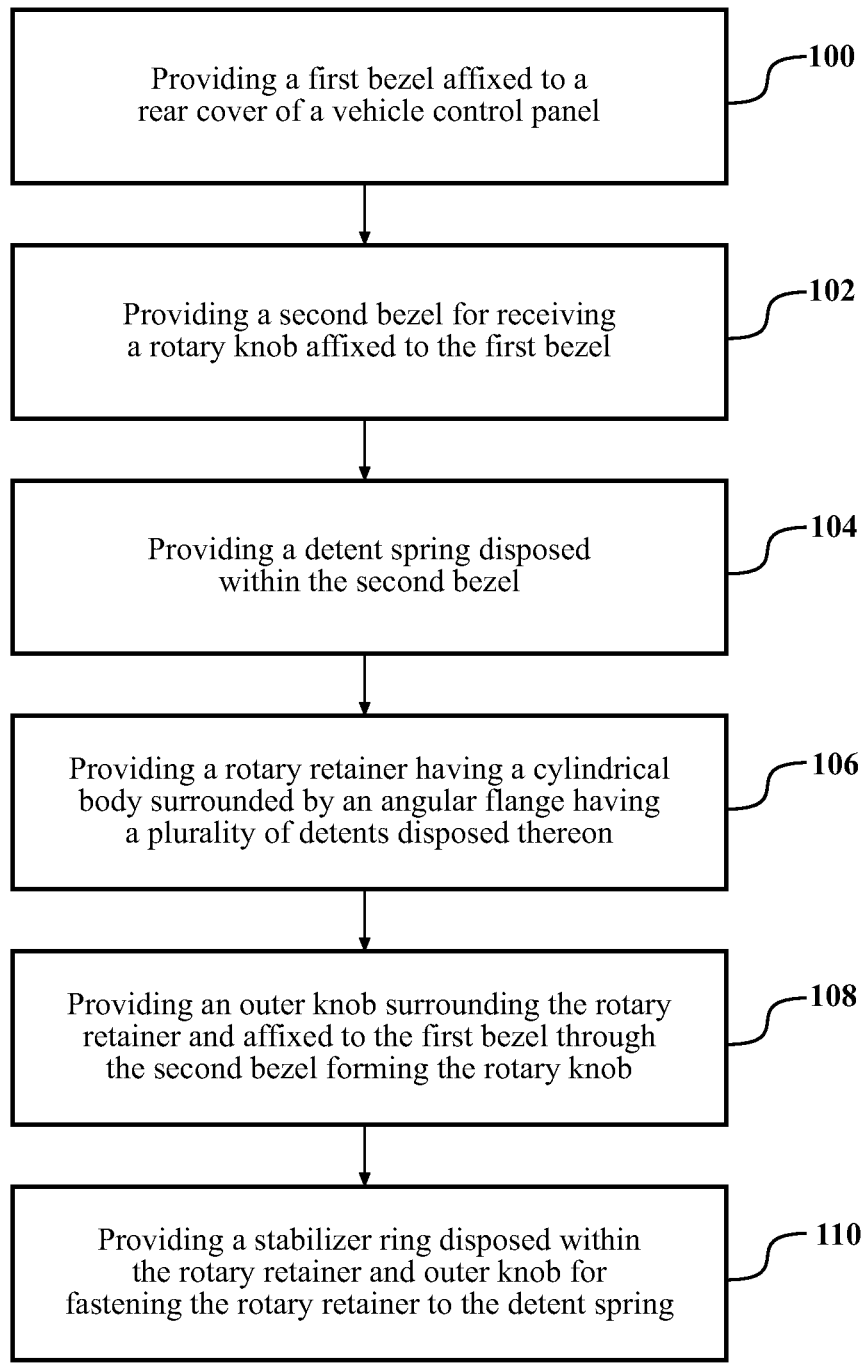
FIG. 8 is a flowchart of a method for reducing noise of a rotary knob assembly in accordance with the present disclosure.

FIG. 8 is a flowchart of the method for reducing noise caused from a rotary knob assembly in accordance with the present disclosure. The method includes providing a first bezel affixed to a rear cover of a vehicle control panel 100 and providing a second bezel for receiving a rotary knob, the second bezel may be affixed to the first bezel 102. A detent spring having at least one stop for alerting the user when the rotary knob is rotated to a specific position may also be provided 104.

The method also includes providing or forming a rotary retainer 106. The rotary retainer may have a generally cylindrical body and an angular flange protruding outwardly from and around the generally cylindrical body. The angular flange may have a plurality of detents disposed thereon. The angular flange may be made of a first material capable of sustaining a torque exceeding a first predetermined threshold and the plurality of detents may be made of a second material different from the first material. The second material may be capable of sustaining a torque exceeding a second predetermined threshold. Furthermore, the first material and the second material may be configured to dampen noise generated by the plurality of detents when the rotary knob is operated.

The angular flange having a first portion made of the first material and a second portion made of a third material. Specifically, the plurality of detents may be disposed on the first portion of the angular flange and the first portion of the angular flange may be disposed on the second portion of the angular flange. An outer knob may surround the rotary retainer and may be rotatably affixed to the first bezel through the second bezel forming a rotary knob 108. A stabilizer ring may be disposed within the rotary retainer and the outer knob 110. In particular, the stabilizer ring fastens the rotary retainer to the detent spring and the plurality of detents engage the detent spring.

While examples of the disclosure have been illustrated and described, it is not intended that these examples illustrate and describe all possible forms of the disclosure. Rather, the words used in the specification are words of description rather than limitation, and it is understood that various changes may be made without departing from the spirit and scope of the disclosure. Additionally, the features and various implementing embodiments may be combined to form further examples of the disclosure.

What is claimed:

1. A rotary knob assembly for reducing noise produced by a rotary knob, comprising:
a rotary retainer having a generally cylindrical body and an angular flange protruding outwardly from and around said generally cylindrical body; and
a plurality of detents disposed on said angular flange,
wherein said angular flange is made of a first material capable of sustaining a torque exceeding a first predetermined threshold and wherein said plurality of detents are made of a second material different from said first material, said second material being capable of sustaining a torque exceeding a second predetermined threshold, and wherein said first material and said second material are configured to dampen noise generated by said plurality of detents when the rotary knob is operated.

2. The rotary knob assembly of claim 1, wherein said angular flange has a first portion made of said first material and a second portion made of a third material and wherein said plurality of detents are disposed on said first portion of said angular flange and said first portion of said angular flange is disposed on said second portion of said angular flange.

3. The rotary knob assembly of claim 2, wherein said third material is the same as said second material.

4. The rotary knob assembly of claim 1, wherein said first material is one of a polymeric material and a thermoplastic elastomer.

5. The rotary knob assembly of claim 1, wherein said second material is hytrel.

6. The rotary knob assembly of claim 1, further comprising:
a stabilizer ring disposed within said rotary retainer; and
a detent spring having at least one stop,
wherein said stabilizer ring fastens said rotary retainer to said detent spring and said plurality of detents engage said detent spring.

7. The rotary knob assembly of claim 6, wherein noise is produced when said plurality of detent engage said detent spring after a torque cause said plurality of detents to disengage said detent spring during operation of the rotary knob.

8. The rotary knob assembly of claim 1, further comprising:
an outer knob surrounding said rotary retainer for gripping by a user.

9. The rotary knob assembly of claim 8, wherein said outer knob receives a chrome ring and a button to form a front portion of the rotary knob.

10. The rotary knob assembly of claim 1, wherein said second predetermined threshold of said second material may be equal to the first predetermined threshold said first material.

11. The rotary knob assembly of claim 1, wherein said second predetermined threshold of said second material is different from said first predetermined threshold of said first material.

12. A rotary knob assembly for reducing noise produced by a rotary knob, comprising:
a first bezel affixed to a rear cover of a vehicle control panel;
a second bezel for receiving the rotary knob assembly affixed to said first bezel;
a detent spring having at least one stop disposed within said second bezel;
a rotary retainer having a generally cylindrical body and an angular flange protruding outwardly from and around said generally cylindrical body, said angular flange having a plurality of detents disposed thereon, wherein said plurality of detent engage said detent spring and said rotary retainer is configured to rotate about said detent spring;

a stabilizer ring disposed within said generally cylindrical body of said rotary retainer for attaching said rotary retainer to said detent spring; and an outer knob surrounding said rotary retainer rotatably affixed to said first bezel forming the rotary knob;

wherein said angular flange of said rotary retainer is made of a first material capable of sustaining a torque exceeding a first predetermined threshold and wherein said plurality of detents are made from a second material different from said first material, said second material being capable of sustaining a torque exceeding a second predetermined threshold, and wherein said first material and said second material are configured to dampen noise generated by said plurality of detents when said plurality of detents disengage and reengage said detent spring.

13. A method of reducing noise produced by a rotary knob assembly, comprising:

providing a rotary retainer having a generally cylindrical body and an angular flange protruding outwardly from and around the generally cylindrical body, the angular flange having a plurality of detents disposed thereon, wherein the angular flange is made of a first material capable of sustaining a torque exceeding a first predetermined threshold and wherein the plurality of detents are made of a second material different from the first material, the second material being capable of sustaining a torque exceeding a second predetermined threshold, and wherein the first material and the second material are configured to dampen noise generated by the plurality of detents when the rotary knob is operated.

14. The method of claim 13, wherein the angular flange has a first portion made of the first material and a second portion made of a third material and wherein the plurality of detents are disposed on the first portion of the angular flange and the first portion of the angular flange is disposed on the second portion of the angular flange.

15. The method of claim 13, further including:

providing a first bezel affixed to a rear cover of a vehicle control panel;

providing a second bezel for receiving a rotary knob affixed to the first bezel;

providing an outer knob around the rotary retainer rotatably affixed to the first bezel forming a rotary knob.

16. The method of claim 15, further including:

providing a stabilizer ring disposed within the rotary retainer and outer knob; and providing a detent spring having at least one stop for receiving the plurality of detents, wherein the stabilizer ring fastens the rotary retainer to the detent spring and the plurality of detents engage the detent spring.

* * * * *